United States Patent
Kim et al.

(10) Patent No.: US 10,218,219 B2
(45) Date of Patent: Feb. 26, 2019

(54) COIL DEVICE AND APPARATUS INCLUDING THE SAME

(71) Applicant: SAMSUNG ELECTRO-MECHANICS CO., LTD., Suwon-si (KR)

(72) Inventors: Chul Kyu Kim, Suwon-si (KR); Han Kim, Suwon-si (KR); Kyung Hyun Park, Suwon-si (KR); Ki Won Chang, Suwon-si (KR); Jung Wook Seo, Suwon-si (KR); Jae Suk Sung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 285 days.

(21) Appl. No.: 15/200,371

(22) Filed: Jul. 1, 2016

(65) Prior Publication Data
US 2017/0004921 A1    Jan. 5, 2017

(30) Foreign Application Priority Data

Jul. 3, 2015   (KR) .................. 10-2015-0095486
Nov. 27, 2015  (KR) .................. 10-2015-0167918

(51) Int. Cl.
*H01F 38/14*   (2006.01)
*H02J 50/10*   (2016.01)
*H01F 27/22*   (2006.01)

(52) U.S. Cl.
CPC ............ *H02J 50/10* (2016.02); *H01F 27/22* (2013.01); *H01F 38/14* (2013.01); *H01F 2038/143* (2013.01)

(58) Field of Classification Search
CPC .. H02J 50/10; H02J 50/80; H02J 5/005; H02J 7/025; H02J 17/00; H01F 38/14; H01F 27/22; H01F 2038/143
USPC ........................................................ 307/104
See application file for complete search history.

(56) References Cited

U.S. PATENT DOCUMENTS

2013/0175984 A1    7/2013  Yamazaki et al.
2015/0326055 A1*  11/2015  Koyanagi ............. H02J 50/12
                                                   455/573
2017/0025884 A1*   1/2017  Raab .................... H04B 5/0037

FOREIGN PATENT DOCUMENTS

JP    2008-205264 A    9/2008
JP    2013-140880 A    7/2013

* cited by examiner

*Primary Examiner* — Carlos D Amaya
(74) *Attorney, Agent, or Firm* — NSIP Law (57) ABSTRACT

A coil device comprises a first coil, a second coil, a first conductor, and a first film. The second coil is disposed inside an inner boundary line of the first coil. The first conductor is disposed between the inner boundary line of the first coil and an outer boundary line of the second coil to dissipate heat. The first film is disposed on upper surfaces of the first coil, the second coil, and the first conductor.

20 Claims, 12 Drawing Sheets

COIL DEVICE AND APPARATUS INCLUDING THE SAME

CROSS-REFERENCE TO RELATED APPLICATIONS

This application claims benefit under 35 USC 119(a) of Korean Patent Application No. 10-2015-0095486, filed on Jul. 3, 2015, and Korean Patent Application No. 10-2015-0167918, filed on Nov. 27, 2015 with the Korean Intellectual Property Office, the entire disclosure of which is incorporated herein by reference for all purposes.

BACKGROUND

1. Field

The following description relates to a coil device including a plurality of coils, and an apparatus including the same.

2. Description of Related Art

Wireless power transfer technology of wirelessly transmitting power through a coil and wirelessly receiving the wirelessly transmitted power has been widely applied to chargers of various communications apparatuses including smartphones and a number of home appliances, and may in future also be applied to electric vehicles. Various attempts have been made to improve coils used to transmit and/or receive wireless power in order to improve charging efficiency, increase a device's lifespan, and to improve performance of a circuit.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a coil device includes a first coil, a second coil, a first conduction part, and a first film. The second coil is disposed inside an inner boundary line of the first coil. The first conduction part is disposed between the inner boundary line of the first coil and an outer boundary line of the second coil to dissipate heat. The first film is disposed on upper surfaces of the first coil, the second coil, and the first conduction part.

The first coil may be configured for transmitting and receiving data. The second coil may be configured for receiving wirelessly transmitted power.

A thickness of the first conduction part may be less than or equal to a thickness of the first coil or a thickness of the second coil.

The first film may include an adhering layer fixing the first film to the first coil, the second coil, and the first conduction part; and an insulating layer disposed on a surface of the adhering layer.

The coil device may further include a second conduction part, a third conduction part, and a fourth conduction part. The second conduction part may be disposed between patterns of the first coil to dissipate heat. The third conduction part may be disposed between patterns of the second coil to dissipate heat. The fourth conduction part may be disposed on the periphery of the second coil to dissipate heat.

The coil device may further include a board having an upper surface bonded to lower surfaces of the first coil, the second coil, and the first conduction part.

The coil device may further include a third coil, a fourth coil, and a second conduction part. The third coil may be disposed on a lower surface of the board and connected to the first coil to form a two-layer coil structure. The fourth coil may be disposed on the lower surface of the board and connected to the second coil to form a two-layer coil structure. The second conduction part may be disposed between the third coil and the fourth coil to dissipate heat.

The coil device may further include a second film disposed on lower surfaces of the third coil, the fourth coil, and the second conduction part. A thickness of the second conduction part may be smaller than or equal to a thickness of the third coil or a thickness of the fourth coil.

The coil device may further include a magnetic sheet and a heat dissipation sheet. The magnetic sheet may have an upper surface bonded to lower surfaces of the first coil, the second coil, and the first conduction part. The heat dissipation sheet may be disposed on the lower surface of the magnetic sheet to dissipate heat.

The coil device may further include at least one via disposed in the magnetic sheet and transferring heat generated in the second coil to the heat dissipation sheet.

The distances between the inner boundary line of the first coil and the outer boundary line of the second coil may not be equidistant. At least one via may be disposed at a position corresponding to a region in which a distance between the outer boundary line of the second coil is relatively shorter to the inner boundary line of the first coil.

The via may be peripherally disposed in the second coil.

In another general aspect, an apparatus includes a coil device and a power supply unit connected to the coil device. The coil device includes a first coil, a second coil, a first conduction part, and a first film. The second coil is disposed inside an inner boundary line of the first coil. The first conduction part is disposed between the inner boundary line of the first coil and an outer boundary line of the second coil to dissipate heat. The first film is disposed on upper surfaces of the first coil, the second coil, and the first conduction part.

The first coil may be configured for transmitting and receiving data. The second coil may be configured for receiving wirelessly transmitted power. The power supply unit may include a battery storing the power received by the second coil.

A thickness of the first conduction part may be less than or equal to a thickness of the first coil or a thickness of the second coil.

In another general aspect, a coil device includes a first reception coil and a first communications coil. The first reception coil is configured for receiving wirelessly transmitted power. The first reception coil is disposed on a first thermal conductor. The first communications coil is configured as a transceiver and is adjacently disposed about a periphery of the first reception coil. The first communications coil is disposed on a second thermal conductor. The first thermal conductor is thermally connected to the second thermal conductor. The heat generated by the first reception coil is thermally conducted through the first and second thermal conductors.

The first thermal conductor may be thermally connected to the second thermal conductor through thermal radiation.

The coil device of claim may further include a second reception coil, a second communications coil, and a board. The second reception coil is configured for receiving wirelessly transmitted power. The second reception coil is disposed on a third thermal conductor. The second communications coil is configured as a transceiver being adjacently disposed about a periphery of the second reception coil. The second communications coil is disposed on a fourth thermal conductor. The third thermal conductor is thermally connected to the fourth thermal conductor. Heat generated by the second reception coil is thermally conducted through the third and fourth thermal conductors. The board is disposed between an upper layer being defined by the first reception coil, the first thermal conductor, the first communications coil, and the second thermal conductor, and a lower layer being defined by the second reception coil, the third thermal conductor, the second communications coil, and the fourth thermal conductor.

Via holes may thermally connect the first thermal conductor to the third thermal conductor and the second thermal conductor to the fourth thermal conductor.

A center of the first reception coil may be laterally offset from a center of the first communications coil.

A heat dissipation layer may be disposed below the first reception coil, the first thermal conductor, the first communications coil, and the second thermal conductor.

Via holes may thermally connect the first and second thermal conductors to the heat dissipation layer.

The via holes may be located in an area determined to be the hottest region of the first reception coil. The hottest region of the first reception coil may be determined based on a heat map and/or heat signature of the coil device.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Unless indicated otherwise, a statement that a first layer is "on" a second layer or a substrate is to be interpreted as covering both a case where the first layer directly contacts the second layer or the substrate, and a case where one or more other layers are disposed between the first layer and the second layer or the substrate.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second layer disposed above a first layer based on the orientation of the device illustrated in the drawings also encompasses the device when the device is flipped upside down in use or operation The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 1:
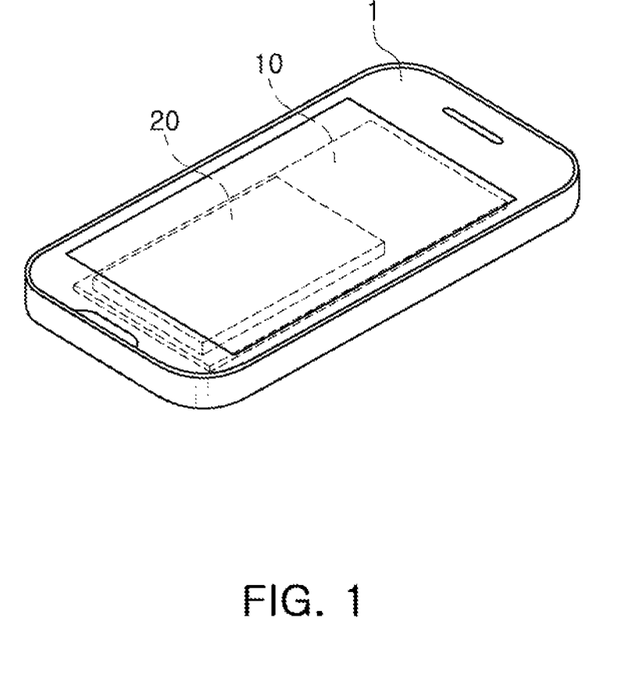
FIG. 1 is a view schematically illustrating an example of an apparatus including a coil device.

FIG. 1 is a view schematically illustrating an apparatus including a coil device. The apparatus 1 includes a coil device 10 and a power supply unit 20.

The coil device 10 may receive wirelessly transmitted power to output charging power. The coil device 10 may include a plurality of coils. At least one of the plurality of coils may receive the wirelessly transmitted power.

The power supply unit 20 may receive the charging power supplied from the coil device 10 to store energy therein. The power supply unit 20 may include a battery to store the energy, and supply power to various components of the apparatus 1 including the coil device 10 using the stored energy.

The apparatus 1 may perform various operations using the energy stored in the power supply unit 20. For example, the apparatus 1 may include a display device (not illustrated) receiving power supplied from the power supply unit 20 to display various information, and may include a communications module (not illustrated), a microphone (not illustrated), and a speaker (not illustrated) receiving power supplied from the power supply unit 20 to perform a mobile communications function.

An example in which the apparatus 1 includes a separate coil device 10 is illustrated in FIG. 1, but components constituting the coil device 10 may also be implemented integrally with the apparatus 1. For example, a reception coil of the coil device 10 may be implemented integrally with a case of the apparatus 1, which means that the case of the apparatus 1 is the coil device. Alternatively, the coil device 10 may further include a rectifying circuit configured to rectify the power received by the reception coil. The rectifying circuit may be disposed in the coil device 10 separately from the apparatus as illustrated in FIG. 1, or may be disposed on a printed circuit board, or the like, present in the apparatus 1.

In addition, a mobile phone has been illustrated as the apparatus 1 including the coil device 10 according to the example in FIG. 1, but the coil device 10 according to the present disclosure may be applied to various apparatuses wirelessly receiving power.

Further, the example in FIG. 1 depicts a wireless power reception device receiving wirelessly transmitted power; however, the coil device may also be a wireless power transceiver device that wirelessly transmits and/or receives power.

Hereinafter, for conciseness and brevity, the coil device will be described as a wireless power reception device receiving the wirelessly transmitted power by way of example.

Figure 2:
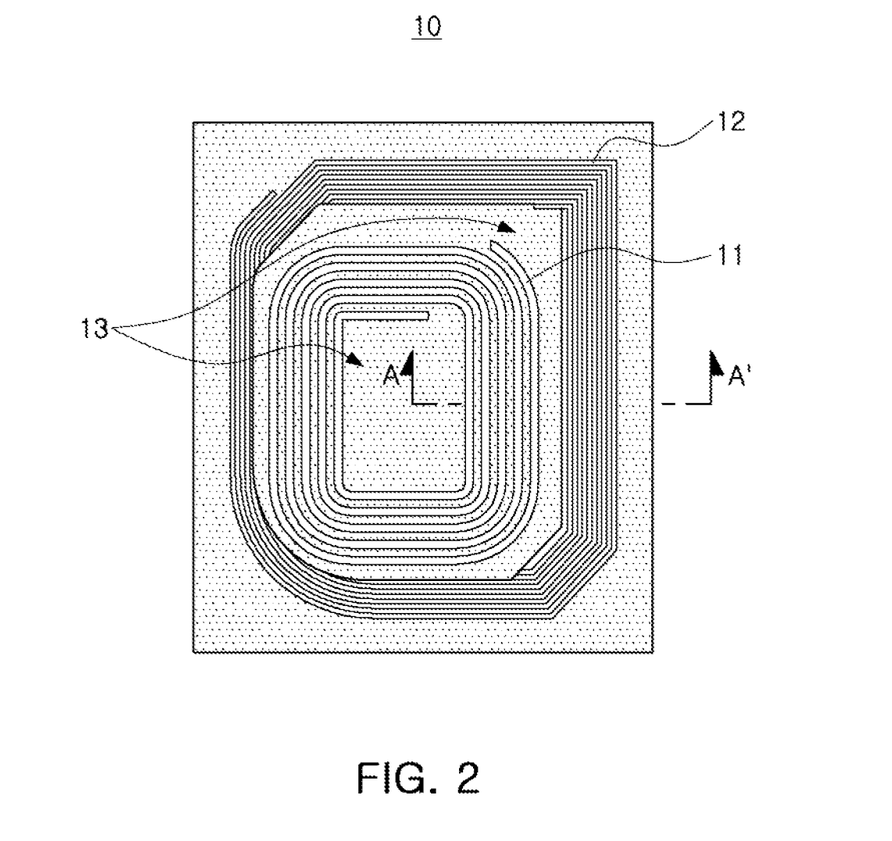
FIG. 2 is a plan view schematically illustrating an example of a coil device.

FIG. 2 is a plan view schematically illustrating an example of a coil device. A coil device 10 includes a reception coil 11, a communications coil 12, and conduction parts 13.

As illustrated in FIG. 2, the coil device 10 includes a plurality of coils, that is, the reception coil 11 and the communications coil 12. The reception coil 11 is disposed inside an inner boundary line of the communications coil 12.

The reception coil 11 receives power wirelessly transmitted from a wireless power transmission device.

The communications coil 12 may be a coil for performing various communications functions. The communications coil 12, which is an antenna for short range communications, may be, for example, a near field communications (NFC) antenna, or the like. Alternatively, the communications coil 12 may be an antenna for mobile payment such as a magnetic secure transmission (MST) antenna, or the like.

The conduction part 13 may dissipate heat generated in the reception coil 11.

The conduction part 13 is disposed outside of the reception coil 11. In detail, the conduction part 13 is disposed between the reception coil 11 and the communications coil 12, which allows the conduction part 13 to transfer the heat generated in the reception coil 11 to the communications coil 12.

The conduction part 13 may also be disposed inside the reception coil 11, which allows the conduction part 13 to dissipate the heat generated in the reception coil 11 to wider regions.

The conduction part 13 may contain a material having excellent thermal conductivity. The conduction part 13 may have thermal conductivity between 0.2 W/m·K and 400 W/m·K. The excellent thermal conductivity may include a heat dissipation solder epoxy, a heat dissipation solder resister, and other thermally conductive plastics. The conduction part 13 may be formed by providing a thermally conductive plastic in a liquid state between coil patterns of the reception coil 11, between coil patterns of the communications coil 12, and between the reception coil 11 and the communications coil 12 and then solidifying the thermally conductive plastic.

Therefore, in the coil device 10, the heat generated in the reception coil 11 is further dissipated throughout an entire module, and thus, heat dissipation performance of the coil device 10 is improved.

Although not illustrated, in a different scheme, instead of the communications coil 12 being disposed at an outer side portion of the reception coil 11, another heat dissipating member rather than a coil may be disposed at the outer side portion of the reception coil 11. In addition, the reception coil for receiving the power may be disposed at an outer side, and the coil for communications may be disposed inside an inner boundary line of the reception coil.

Figure 3:
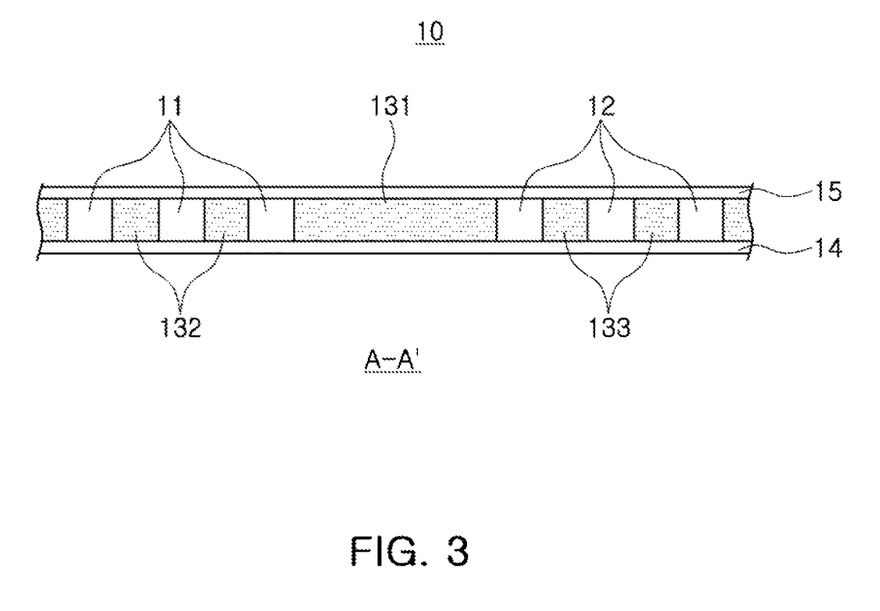
FIG. 3 is a partial cross-sectional view schematically illustrating an example of a coil device.

FIG. 3 is a partial cross-sectional view schematically illustrating an example of a coil device 10 taken along line A-A' of FIG. 2. In FIG. 3, reference numeral 11 indicates a reception coil, reference numeral 12 indicates a communications coil, a reference numeral 131 indicates a first conduction part, a reference numeral 132 indicates a second conduction part, reference numeral 133 indicates a third conduction part, reference numeral 14 indicates a board, and reference numeral 15 indicates a film.

As described above with reference to FIG. 2, the reception coil 11 is for receiving the wirelessly transmitted power, and the communications coil 12 is for performing various communications functions.

The reception coil 11 and the communications coil 12 are formed on the board 14. The board 14 may be a flexible printed circuit board (FPCB). The flexible printed circuit board may be implemented by a polyimide film, or the like.

The film 15 may prevent impact damage to the reception coil 11 and the communications coil 12, and may electrically insulate the reception coil 11 and the communications coil 12 from external factors. A thickness of the film 15 may be 10 μm to 15 μm.

That is, the film 15 is attached to one and/or the other side of the reception coil 11, the communications coil 12, and the first to third conduction parts 131-133. The film 15 forms an outer layer for insulating or protecting the reception coil 11 and the communications coil 12 from external factors The first conduction part 131, the second conduction part 132, and the third conduction part 133 may contain a material having excellent thermal conductivity, and may dissipate heat generated in the reception coil 11. As illustrated in FIG. 3, a thickness of the first conduction part 131, the second conduction part 132, and the third conduction part 133 is substantially the same as that of the reception coil 11 and/or the communications coil 12. In some cases, a thickness of the first conduction part 131, the second conduction part 132, and the third conduction part 133 may also be less than that of the reception coil 11 and/or the communications coil 12. In detail, a thickness of the first conduction part 131 may be less than or equal to the larger thickness between a thickness of the reception coil 11 and a thickness of the communications coil 12. A thickness of the second conduction part 132 may be less than or equal to the thickness of the reception coil 11, and a thickness of the third conduction part 133 may be less than or equal to the thickness of the communications coil 12. Each of the first conduction part 131, the second conduction part 132, and the third conduction part 133 may be formed by providing a liquid-phase material in a corresponding region of a coil portion of the coil device 10 and then hardening the liquid-phase material.

The first conduction part 131 is disposed between the reception coil 11 and the communications coil 12, and dissipates the heat generated in the reception coil 11 by transferring the heat to the communications coil 12.

The second conduction part 132 is disposed between patterns of the reception coil 11, and dissipates the heat between the patterns of the reception coil 11.

The third conduction part 133 is disposed between patterns of the communications coil 12, and dissipates the heat between the patterns of the communications coil 12.

Figure 4:
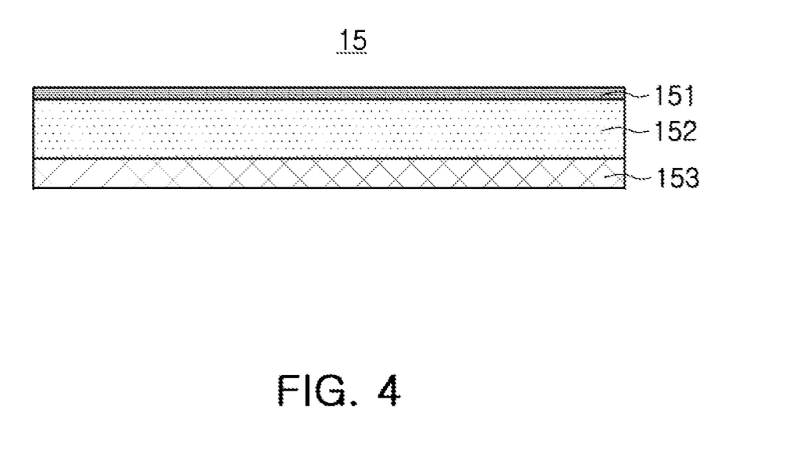
FIG. 4 is a view schematically illustrating an example of a film of a coil device.

FIG. 4 is a view schematically illustrating an example of a film 15 of a coil device 10. The film 15 includes a black ink layer 151, an insulating layer 152, and an adhering layer 153.

The black ink layer 151 is disposed at an outer side portion of the film 15.

The insulating layer 152 is formed of an insulating material such as polyethylene terephthalate (PET), polyimide (PI), or the like, and is disposed between the black ink layer 151 and the adhering layer 153.

The adhering layer 153 serves to fix the film 15 to the reception coil 11 and the communications coil 12 (see FIG. 3).

An entire thickness of the black ink layer 151, the insulating layer 152, and the adhering layer 153 of the film 15 is approximately 15 μm or less.

Although not illustrated, the insulating layer 152 may be formed of black polyimide, and in such case, the black ink layer 151 is omitted.

Figure 5:
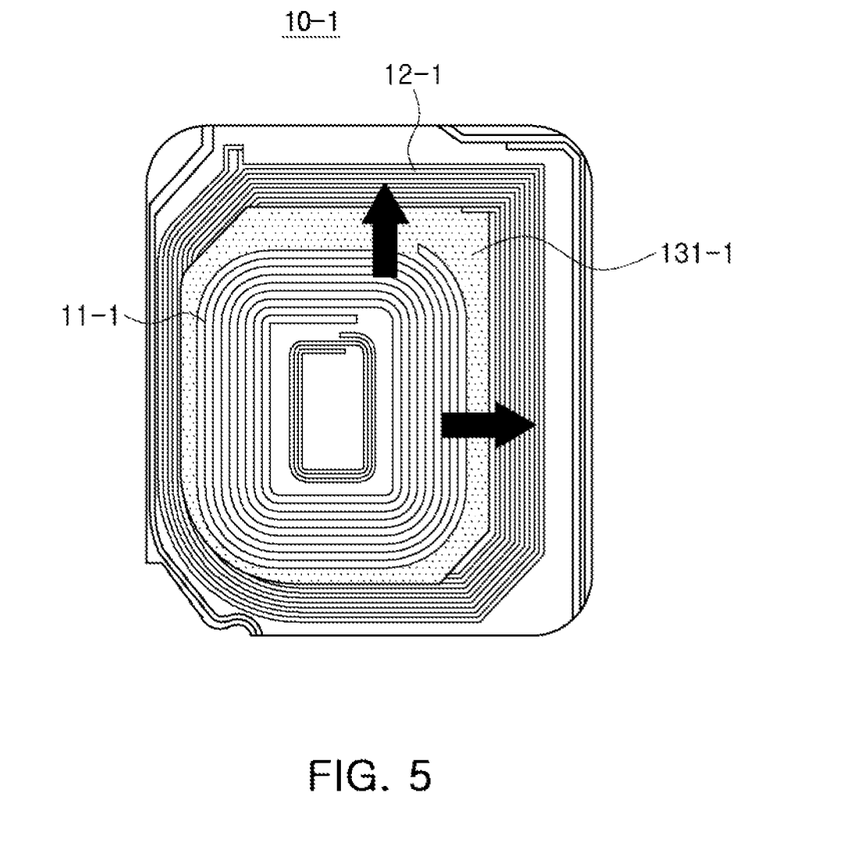
FIGS. 5 and 6 are plan views schematically illustrating examples of a coil device.

FIG. 5 is a plan view schematically illustrating an example of a coil device.

As illustrated in FIG. 5, a coil device 10-1 includes a first conduction part 131-1 disposed between a reception coil 11-1 and a communications coil 12-1 in order to dissipate heat. Therefore, heat generated in the reception coil 11-1 is transferred to the communications coil 12-1.

In addition, as illustrated in FIG. 5, the coil device 10-1 includes an additional coil disposed inside the reception coil 11-1. The additional coil disposed inside the reception coil 11-1 may be a coil for communications for transmitting and receiving data or a coil for receiving wirelessly transmitted power.

In addition, as illustrated in FIG. 5, the coil device 10-1 according to an exemplary embodiment in the present disclosure may include an additional coil disposed outside of the communications coil 12-1. The additional coil disposed outside the boundary of the communications coil 12-1 may be for transmitting and receiving data or for receiving wirelessly transmitted power.

In addition, the additional coil disposed inside of the reception coil 11-1 and the additional coil disposed outside of the communications coil 12-1 may be electrically connected to each other.

Figure 6:
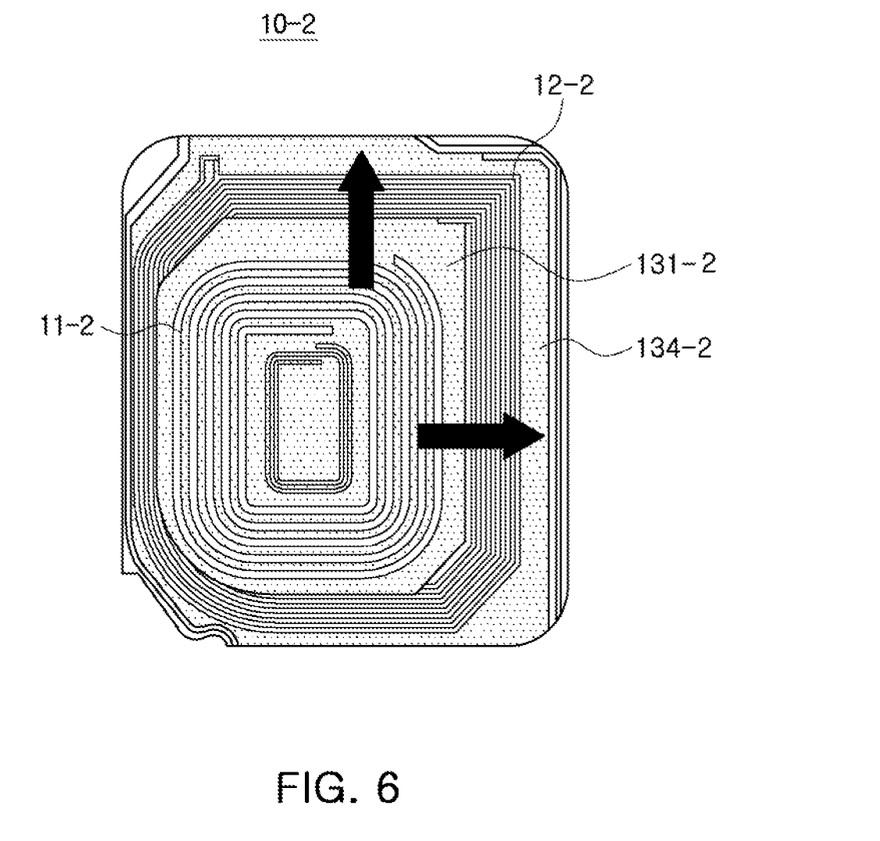

FIG. 6 is a plan view schematically illustrating an example of a coil device.

As illustrated in FIG. 6, a coil device 10-2 includes a reception coil 11-2, a communications coil 12-2, a first conduction part 131-2, and a fourth conduction part 134-2.

Each of the first conduction part 131-2 and the fourth conduction part 134-2 may contain a material having excellent thermal conductivity.

The first conduction part 131-2 is disposed between the reception coil 11-2 and the communications coil 12-2, and dissipates heat generated in the reception coil 11-2 by transferring the heat to the communications coil 12-2.

The fourth conduction part 134-2 is disposed outside of the communications coil 12-2, and dissipates the heat outside the communications coil 12-2.

Therefore, heat generated in the reception coil 11-2 is dissipated externally from the coil device 10-2 through the first conduction part 131-2, the communications coil 12-2, and the fourth conduction part 134-2.

The coil device 10-2 may further include a second conduction part disposed between patterns of the reception coil 11-2 and dissipating heat and a third conduction part disposed between patterns of the communications coil 12-2 and dissipating heat.

In addition, as illustrated in FIG. 6, the coil device 10-2 includes an additional coil disposed inside of the reception coil 11-2. The additional coil disposed inside of the reception coil 11-2 may be a coil for communications for transmitting and receiving data or a coil for receiving wirelessly transmitted power.

In addition, as illustrated in FIG. 6, the coil device 10-2 according to an exemplary embodiment may include an additional coil disposed outside of the communications coil 12-2. The additional coil disposed outside of the communications coil 12-2 may be a coil for communications for transmitting and receiving data or a coil for receiving wirelessly transmitted power.

In addition, the additional coil disposed inside of the reception coil 11-2 and the additional coil disposed outside of the communications coil 12-2 may be electrically connected to each other.

Figure 7:
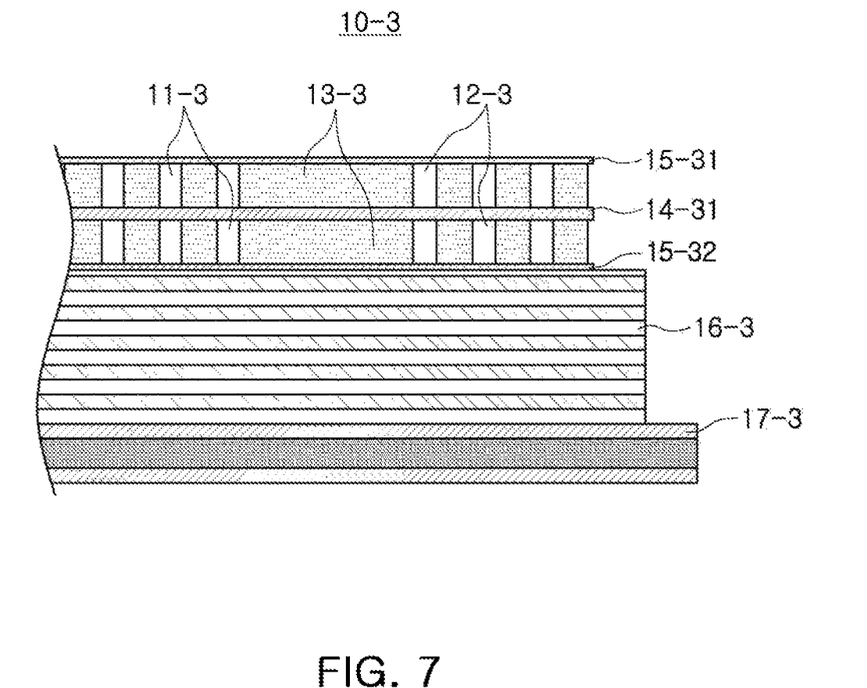
FIGS. 7 and 8 are partial cross-sectional views schematically illustrating examples of a coil device.

FIG. 7 is a partial cross-sectional view schematically illustrating an example of a coil device. Coil device 10-3 includes reception coils 11-3, communications coils 12-3, conduction parts 13-3, a board 14-31, films 15-31 and 15-32, a magnetic sheet 16-3, and a heat dissipation sheet 17-3.

As described above with reference to FIG. 2, the reception coil 11-3 is used for receiving the wirelessly transmitted power, and the communications coil 12-3 performs various communications functions.

As illustrated in FIG. 7, each of the reception coils 11-3 and the communications coils 12-3 are formed on both surfaces of the board 14-31. Although not illustrated, the reception coil 11-3 formed on one surface of the board 14-31 and the reception coil 11-3 formed on the other surface of the board 14-31 may be connected to each other through a via, or the like, and the communications coil 12-3 formed on one surface of the board 14-31 and the communications coil 12-3 formed on the other surface of the board 14-31 may be connected to each other through a via, or the like. That is, each of the reception coil 11-3 and the communications coil 12-3 may be formed in a two-layer structure.

The conduction part 13-3 is adjacently disposed between the reception coil 11-3 and the communications coil 12-3, and transfers heat generated in the reception coil 11-3 to the communications coil 12-3. As illustrated in FIG. 6, the conduction part for dissipating the heat may be adjacently disposed in all or some of spaces between patterns of the reception coil 11-3, between patterns of the communications coil 12-3, outside of the patterns of the communications coil 12-3, and/or inside of the reception coil 11-3.

The board 14-31 may be a flexible printed circuit board implemented by a polyimide film, or the like.

The films 15-31 and 15-32 may prevent damage to the reception coils 11-3 and the communications coils 12-3 due to external forces, and may electrically insulate the reception coils 11-3 and the communications coils 12-3 from external factors. The films 15-31 and 15-32 may have the same configuration as the configuration illustrated in FIG. 4.

The magnetic sheet 16-3 is disposed on one side of the reception coil 11-3. In detail, the magnet sheet 16-3 is disposed between the reception coil 11-3 and an apparatus body (or a battery) that includes the coil device 10-3. The magnetic sheet 16-3 changes a magnetic path of a magnetic field to maintain a magnetic flux density in the reception coil 11-3, and serves to block the magnetic field so as not to have an influence on electronic circuits or components disposed in the apparatus body.

The heat dissipation sheet 17-3 is disposed on one side of the magnetic sheet 16-3, and dissipates the heat generated in the reception coil 11-3.

Figure 8:
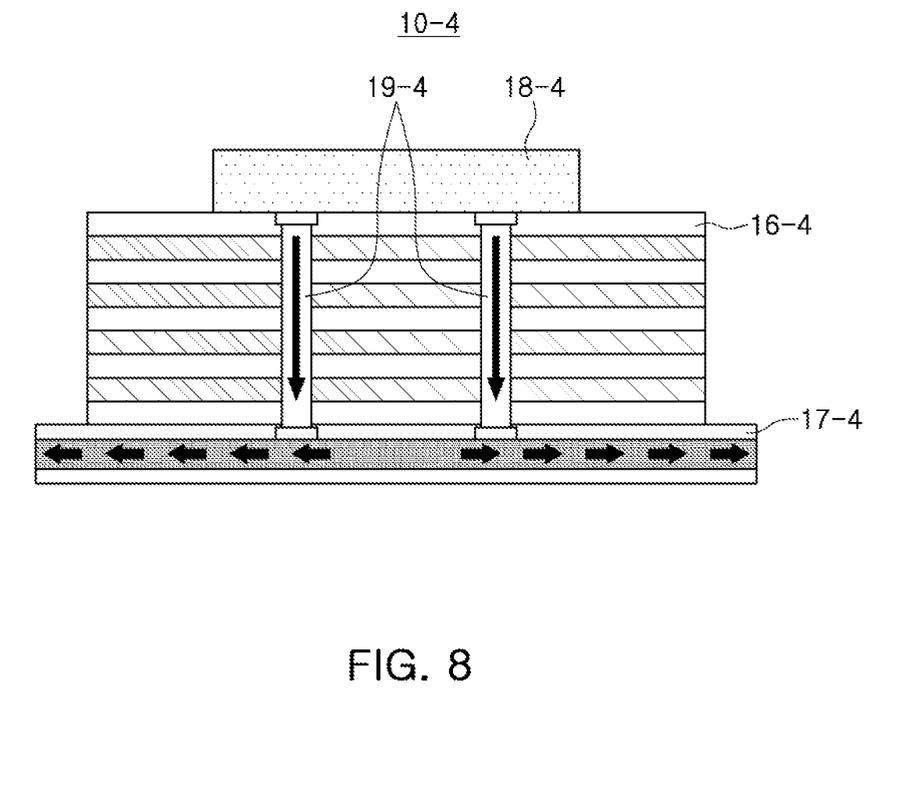

FIG. 8 is a partial cross-sectional view schematically illustrating an example of a coil device. A coil device 10-4 includes a coil part 18-4, a magnetic sheet 16-4, a heat dissipation sheet 17-4, and vias 19-4.

The coil part 18-4 includes a reception coil receiving wirelessly transmitted power. In detail, the coil part 18-4 may include reception coils, communication coils, a board, and a conduction part, as illustrated in FIG. 7.

Configurations and functions of the magnetic sheet 16-4 and the heat dissipation sheet 17-4 may be the same as those of the magnetic sheet and the heat dissipation sheet described above with reference to FIG. 7.

The vias 19-4 are formed in the magnetic sheet 16-4, and transfers heat generated in the coil part 18-4 to the heat dissipation sheet 17-4. The vias 19-4 may be formed by providing a material having high thermal conductivity in the via holes. The excellent thermal conductivity materials may be a heat dissipation epoxy, a heat dissipation solder resist, thermally conductive plastics, or a conductor such as copper. An insulating coating may be added between the via 19-4 and the coil part 18-4.

Figure 9:
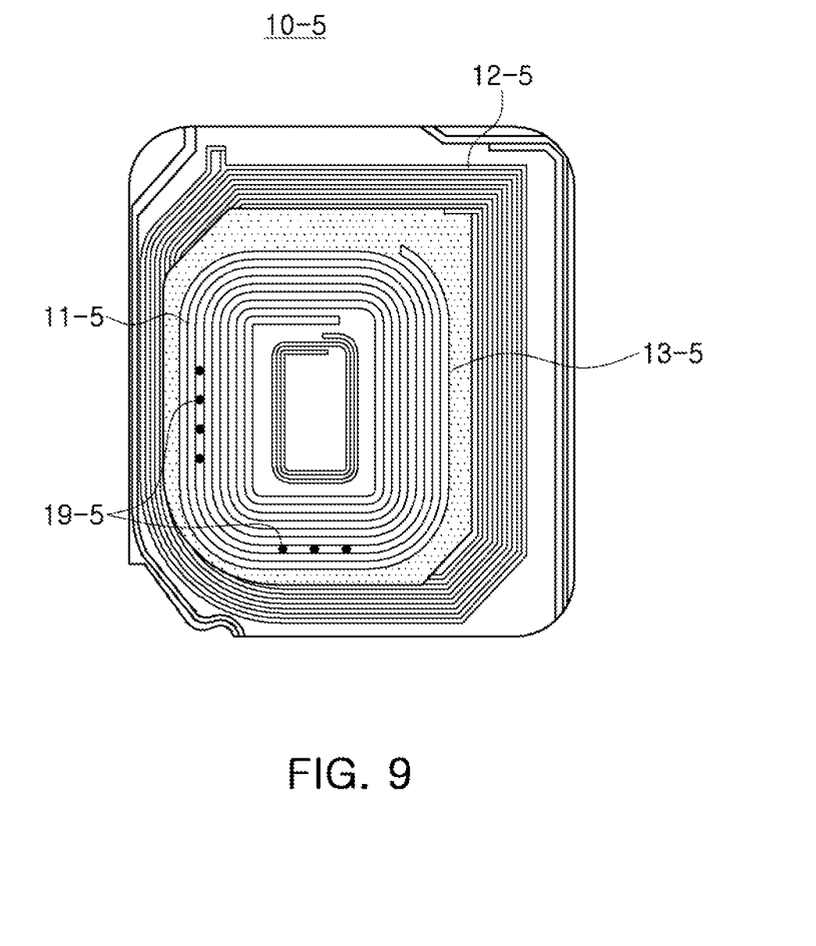
FIGS. 9 and 10 are plan views schematically illustrating examples of a coil device.

FIG. 9 is a plan view schematically illustrating an example of a coil device. The coil device 10-5 includes a reception coil 11-5, a communications coil 12-5, a conduction part 13-5, and vias 19-5.

Functions and configurations of the reception coil 11-5, the communications coil 12-5, and the conduction part 13-5 may be the same as those of the reception coil 11, the communications coil 12, and the conduction part 13, respectively, described above with reference to FIG. 2.

The functions and configurations of the via 19-5 may be the same as those of the via 19-4 described above with reference to FIG. 8.

As illustrated in FIG. 9, the vias 19-5 are disposed in areas of the coil device 10-5. The vias 19-5 are disposed in portions on which heat is concentrated and/or portions that have less of an influence on a magnetic field due to installation of the vias. For example, as illustrated in FIG. 9, the center of the reception coil 11-5 and the center of the communications coil 12-5 are offset from each other. That is, distances between an outer boundary line of the reception coil 11-5 and an inner boundary line of the communications coil 12-5 may be different from each other depending on regions. In this instance, the vias 19-5 are disposed in regions (a lower side and a left side of the reception coil 11-5 in FIG. 9) in which the distance between the outer boundary line of the reception coil 11-5 and the inner boundary line of the communications coil 12-5 are relatively closer, and are not disposed in regions (an upper side and a right side of the reception coil 11-5 in FIG. 9) in which the distance between the outer boundary line of the reception coil 11-5 and the inner boundary line of the communications coil 12-5 are relatively further apart.

Figure 10:
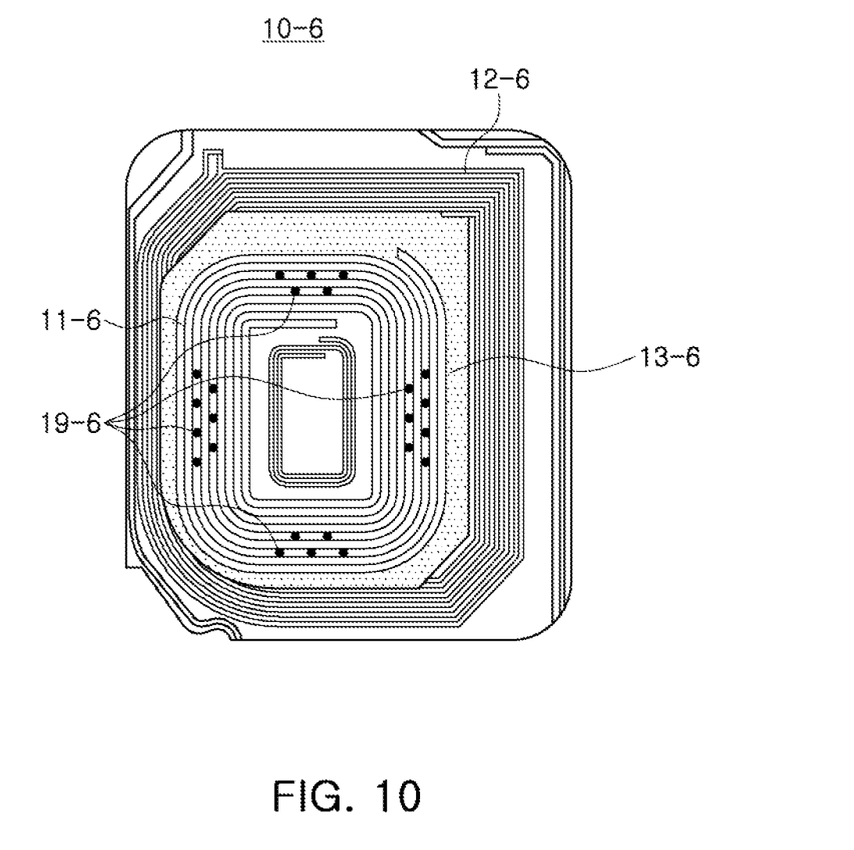

FIG. 10 is a plan view schematically illustrating an example of a coil device. The coil device 10-6 includes a reception coil 11-6, a communications coil 12-6, a conduction part 13-6, and vias 19-6.

Functions and configurations of the reception coil 11-6, the communications coil 12-6, and the conduction part 13-6 may be the same as those of the reception coil 11, the communications coil 12, and the conduction part 13, respectively, described above with reference to FIG. 2.

Functions and configurations of the via 19-6 may be the same as those of the via 19-4 described above with reference to FIG. 8.

As illustrated in FIG. 10, the vias 19-6 are disposed in different regions of the coil device 10-6 to aid in heat dissipation.

Figure 11:
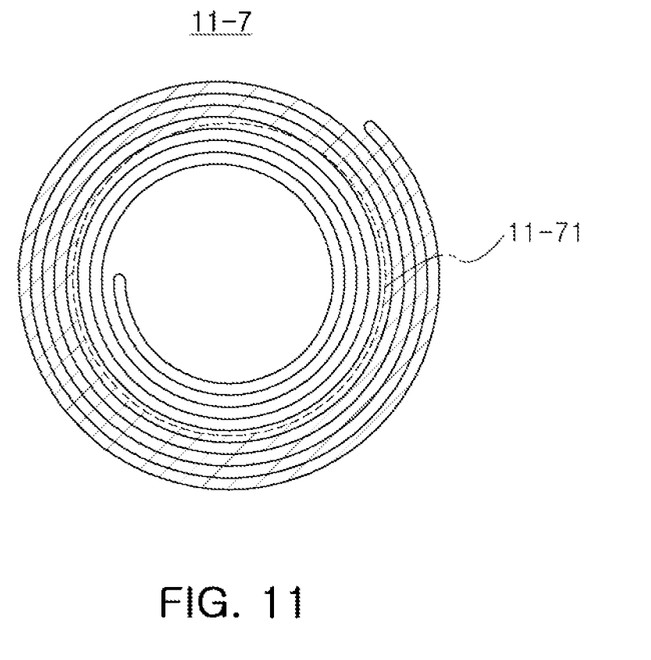
FIGS. 11 and 12 are views schematically illustrating examples of regions in which vias are installed in a coil device, respectively.
Figure 12:
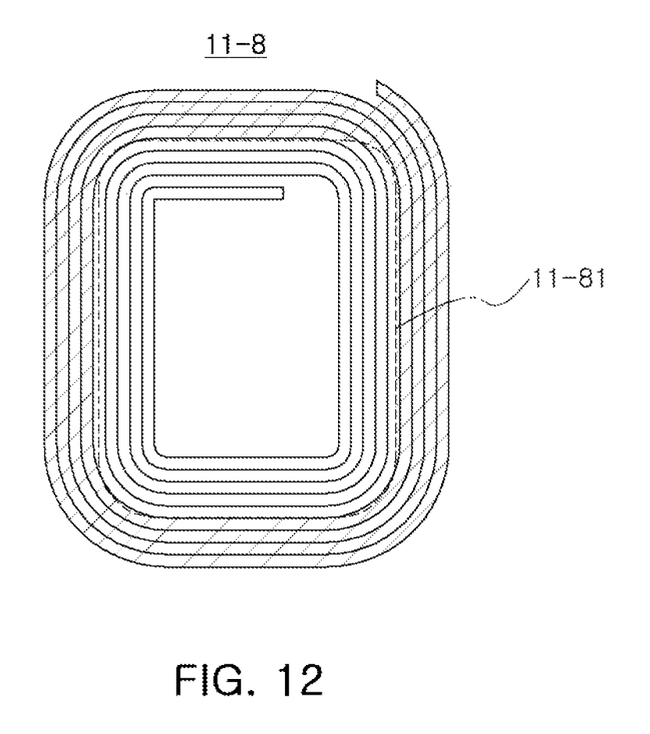

FIGS. 11 and 12 are views schematically illustrating examples of regions in which vias are installed in a coil device, respectively. In FIGS. 11 and 12, regions hatched by an oblique line are regions in which vias are installed.

Referring to FIG. 11, a reception coil 11-7 of a coil device has a circular spiral coil. In this instance, vias are installed at the periphery of the reception coil. In detail, the vias are disposed outside a virtual line 11-71 that indicates the center of a region in which patterns of the reception coil 11-7 are formed.

Referring to FIG. 12, the reception coil 11-8 has a polygonal spiral coil. In this instance, vias are disposed at the periphery of the reception coil, and may be disposed in regions except for corner portions of the reception coil. In detail, the vias are installed outside of a virtual line 11-81 indicating the center of a region in which patterns of the reception coil 11-8 are formed except for the corner portions of the reception coil 11-8.

The vias may be installed in the regions as illustrated in FIGS. 11 and 12 to significantly reduce influencing the magnetic field of the coils.

As set forth above, in the coil device and the apparatus including the same according to examples in the present disclosure, heat dissipation performance is improved, charging efficiency is improved, a device's lifespan is increased, and circuit performance is improved.

As a non-exhaustive example only, an apparatus or communications apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil device comprising:
   a first coil;
   a second coil disposed inside an inner boundary line of the first coil;
   a first conduction part disposed in a same layer as the first coil and the second coil between the inner boundary line of the first coil and an outer boundary line of the second coil, the first conduction part dissipating heat; and
   a first film disposed on upper surfaces of the first coil, the second coil, and the first conduction part.

2. The coil device of claim 1, wherein the first coil is configured to transmit and receive data, and
   the second coil is configured to receive wirelessly transmitted power.

3. The coil device of claim 1, wherein a thickness of the first conduction part is less than or equal to a thickness of the first coil or a thickness of the second coil.

4. A coil device, comprising:
   a first coil;
   a second coil disposed inside an inner boundary line of the first coil;
   a first conduction part disposed between the inner boundary line of the first coil and an outer boundary line of the second coil, the first conduction part dissipating heat; and
   a first film disposed on upper surfaces of the first coil, the second coil, and the first conduction part,
   wherein the first film comprises:
   an adhering layer fixing the first film to the first coil, the second coil, and the first conduction part, and
   an insulating layer disposed on an upper surface of the adhering layer.

5. The coil device of claim 1, further comprising:
   a second conduction part disposed between patterns of the first coil to dissipate heat;
   a third conduction part disposed between patterns of the second coil to dissipate heat; and
   a fourth conduction part disposed on the periphery of the first coil to dissipate heat.

6. The coil device of claim 1, further comprising a board having an upper surface bonded to lower surfaces of the first coil, the second coil, and the first conduction part.

7. The coil device of claim 6, further comprising:
   a third coil disposed on a lower surface of the board and connected to the first coil to form a two-layer coil structure;
   a fourth coil disposed on the lower surface of the board and connected to the second coil to form a two-layer coil structure; and
   a second conduction part disposed between the third coil and the fourth coil to dissipate heat.

8. The coil device of claim 7, further comprising a second film disposed on lower surfaces of the third coil, the fourth coil, and the second conduction part,
   wherein a thickness of the second conduction part is smaller than or equal to a thickness of the third coil or a thickness of the fourth coil.

9. The coil device of claim 1, further comprising:
   a magnetic sheet having an upper surface bonded to lower surfaces of the first coil, the second coil, and the first conduction part; and
   a heat dissipation sheet disposed on the lower surface of the magnetic sheet to dissipate heat.

10. The coil device of claim 9, further comprising at least one via disposed in the magnetic sheet and transferring heat generated in the second coil to the heat dissipation sheet.

11. The coil device of claim 10, wherein distances between the inner boundary line of the first coil and the outer boundary line of the second coil are not equidistant, and
    the at least one via is disposed at a position corresponding to a region in which a distance between the outer boundary line of the second coil is relatively shorter to the inner boundary line of the first coil.

12. The coil device of claim 10, wherein the via is peripherally disposed in the second coil.

13. An apparatus comprising:
    the coil device of claim 1; and
    a power supply unit connected to the coil device.

14. The apparatus of claim 13, wherein the first coil is configured to transmit and receive data,
    the second coil is configured to receive wirelessly transmitted power, and
    the power supply unit comprises a battery storing the power received by the second coil therein.

15. The apparatus of claim 13, wherein a thickness of the first conduction part is less than or equal to a thickness of the first coil or a thickness of the second coil.

16. A coil device comprising:
a first reception coil configured to receive wirelessly transmitted power;
a first thermal conductor disposed between patterns of the first reception coil;
a first communications coil configured as a transceiver being adjacently disposed about a periphery of the first reception coil; and
a second thermal conductor disposed between patterns of the first communications coil, the first thermal conductor being thermally connected to the second thermal conductor, wherein heat generated by the first reception coil is thermally conducted through the first and second thermal conductors.

17. The coil device of claim 16 further comprising:
a second reception coil configured to receive wirelessly transmitted power;
a third thermal conductor disposed between patterns of the second reception coil;
a second communications coil configured as a transceiver being adjacently disposed about a periphery of the second reception coil;
a fourth thermal conductor disposed between patterns of the second communications coil, the third thermal conductor being thermally connected to the fourth thermal conductor, wherein heat generated by the second reception coil is thermally conducted through the third and fourth thermal conductors; and
a board disposed between an upper layer being defined by the first reception coil, the first thermal conductor, the first communications coil, and the second thermal conductor, and a lower layer being defined by the second reception coil, the third thermal conductor, the second communications coil, and the fourth thermal conductor.

18. The coil device of claim 16, wherein a center of the first reception coil is offset from a center of the first communications coil.

19. The coil device of claim 16 further comprising:
a heat dissipation layer disposed below the first reception coil, the first thermal conductor, the first communications coil, and the second thermal conductor; and
at least one via hole configured to transfer the heat generated by the first reception coil to the heat dissipation layer.

20. The coil device of claim 19, wherein the at least one via hole is located in an area determined to be the hottest region of the first reception coil.

* * * * *